INVENTOR.
WILLIAM W. BURNHAM
BY
James P. Malone

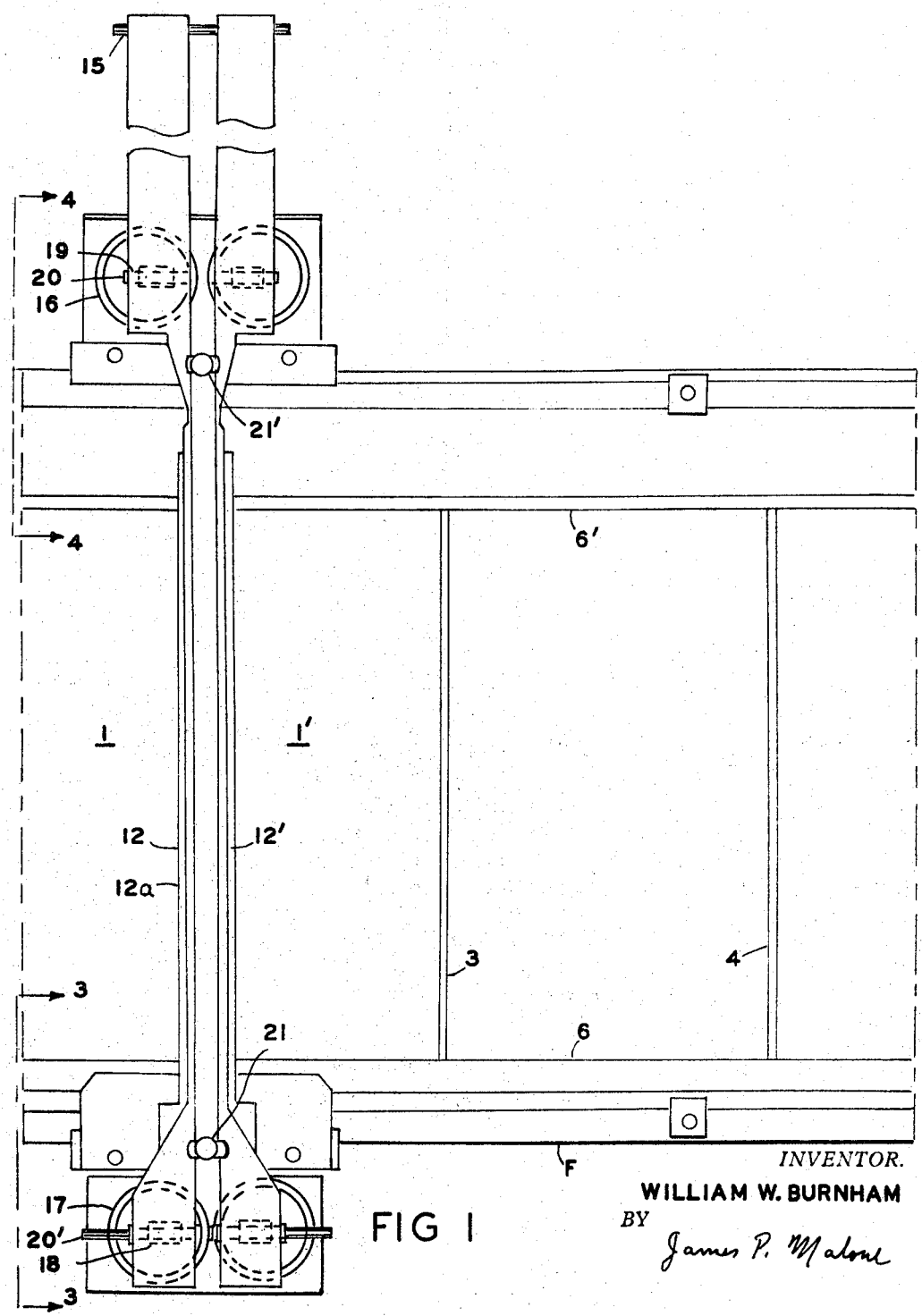

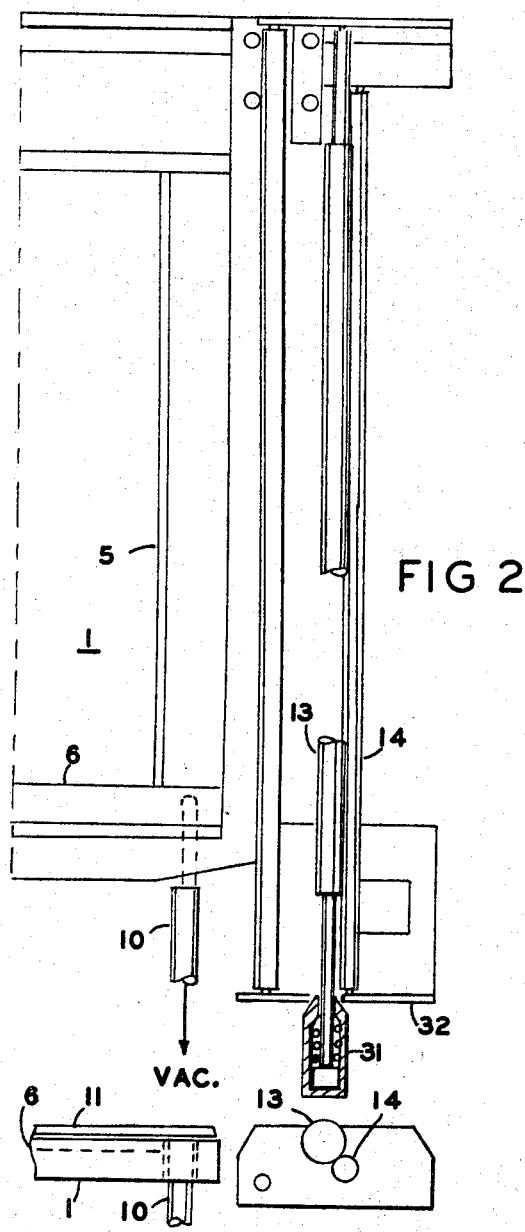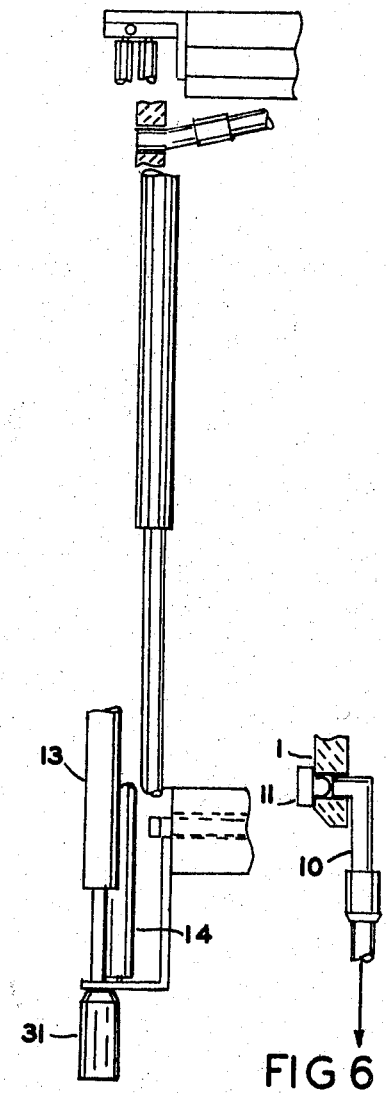

United States Patent Office 3,421,814
Patented Jan. 14, 1969

3,421,814
FILM HOLDING VACUUM MEANS
William W. Burnham, Mineola, N.Y., assignor to OPTOmechanisms, Inc., Plainview, N.Y.
Filed Mar. 25, 1966, Ser. No. 537,495
U.S. Cl. 353—23          5 Claims
Int. Cl. G03b 1/48

ABSTRACT OF THE DISCLOSURE

A mounting plate for holding a film flat against the top by vacuum. The top of the mounting plate has a plurality of communicating grooves and the film is laid over them. The vacuum is then applied to the grooves with a manifold arrangement. Pivotally mounted clamping arms may also be used to hold down the film when it is desired to form a loop in the film in order to place two separated frames together for viewing comparison. These arms are also actuated by the vacuum.

---

This invention relates to film holding means for viewers and more particularly for means to hold film flat with vacuum.

Conventional film viewers generally lay the film on a glass plate and hold it flat with another glass plate, the film being sandwiched in between. In certain cases, it is not possible to do this, for instance, when it is desired to place identification marks on the film while in the viewer or because of space limitations.

The present invention solves this problem by holding the film flat on a mounting plate by means of vacuum. The top of the mounting plate has a plurality of communicating grooves and the film is laid over them. The vacuum is then applied to the grooves with a manifold arrangement. Pivotally mounted clamping arms may also be used to hold down the film when it is desired to form a loop in the film in order to place two separated frames together for viewing comparison. These arms are also actuated by the vacuum.

Accordingly, a principal object of the invention is to provide new and improved film holding means.

Another object of the invention is to provide new and improved means to hold the film flat in a viewer without sandwiching the film between the glass plates.

Another object of the invention is to provide new and improved film holding means using vacuum.

Another object of the invention is to provide new and improved pivotally mounted clamping arm means for holding film flat to permit formation of a loop in the film for the purpose of placing separate frames side by side for comparison viewing.

Another object of the invention is to provide new and improved film holding means comprising a glass plate having a plurality of communicating grooves in its upper surface, said upper surface being adapted to receive a flat film over said grooves, a manifold connected to said grooves, and a source of vacuum connected to said manifold and said grooves to hold down said film.

These and other objects of the invention will be apparent from the following specification and drawings of which:

FIGURES 1 and 2 are plan views of an embodiment of the invention.

FIGURES 3, 4, 5 and 6 are side detail views of the embodiment of FIGURE 1.

FIGURE 7 is a front detail view of the embodiment of FIGURES 1 and 2.

Figure 8:
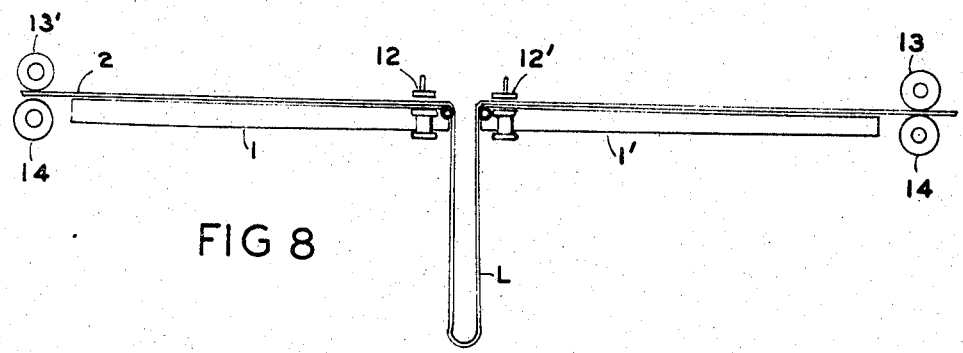
FIGURE 8 is a schematic diagram illustrating the use of the invention when forming a loop in the film.
Figure 4:
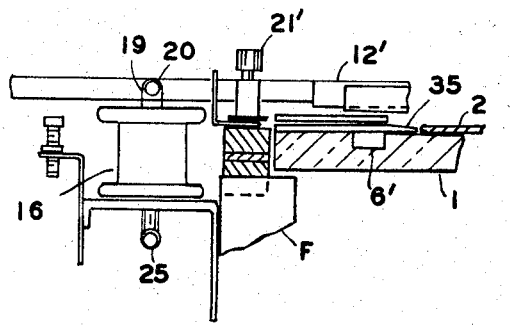
Figure 3:
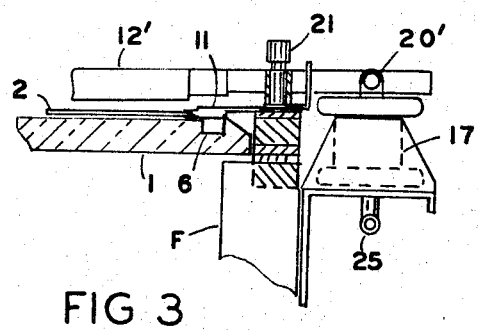

Referring to the figures, the invention generally comprises a pair of glass plates 1 and 1' upon which is placed the film 2. The glass plates may be mounted on frame F by any suitable means and are preferably adapted to be illuminated from underneath so that the film may be viewed by the operator.

It is desired that the film be held flat so that the measurements may be made and the film may be studied. It is also desired in many cases, to place identification marks on the film so that it is not possible to hold the film flat with a glass plate on top.

The present invention solves this problem by providing a plurality of grooves 3, 4 and 5 in the glass plates which are connected together by means of a manifold groove 6 which is provided adjacent one or both edges of the glass plates. The vacuum is applied to the manifold groove as shown in FIGURE 6 by means of tubing 10 which extends through the glass plate 1. The tubing is connected to a source of vacuum. On top of the groove 6 is placed a manifold plate or seal 11. The film is placed on the plate and when the vacuum is applied to the grooves, the film is forced against glass by atmospheric pressure into flat contact with the plate 1. Suitable guides 35 are provided to properly position the film.

In order to assist in clamping down the film when it is desired to form a loop in the film as shown in FIGURE 8, a pair of pivotally mounted arms 12 and 12' are located at the center edges of the glass plates so as to hold down the center edges.

At one end of the glass plate is mounted a film roller arrangement comprising rollers 13 and 14 which are rotatably mounted on the film adjacent the glass plate 1. The bite of the rollers is preferably slightly below the upper surface of glass plate 1 so that the film is held against the surface at the ends of the glass plate, thereby preserving the vacuum seal. FIGURES 1 and 2 show only a portion of the glass plates.

Referring specifically to the clamping arm 12, it is pivotally mounted to the frame by means of the hinge 15. The arm 12 extends across the film surface and has a clamping spring 12a which is adapted to bear against the film. The means for clamping the arm into the clamping position comprises a pair of vacuum bellows 16 and 17 which are mounted on the frame and connected to a source of vacuum. The bellows have mounting ears 18 and 19 so that the bellows may be connected to the arm by means of connecting pins 20 and 20'. The flexible bellows may be made out of soft rubber or other flexible material. The bellows are connected to the same evacuating line as the platen manifold therefore, are energized at film pull down. A positive pressure is preferably valved to manifolds and bellows for film release. This breaks film away from platen quickly and raises central arms 12 and 12' for film advance or loop forming.

Adjustable stop means are provided for the clamping arms to avoid interference of the arms with viewing apparatus. These comprise the thumb screw 21 which is adapted to screw into the frame connected member 22 and the lock arm 12. A similar thumb screw 21' is connected on the other side.

In using the present device, the pivotally mounting arms 12 and 12' are first raised and the film is threaded between the rollers at both ends of the glass plates 1 and 1'. The pivotally mounted arms are then lowered. Vacuum is then applied to the manifold groove 6 by means of the tubing 10 and a corresponding groove 6' on the other side and also to the vacuum bellows by means of the tubings 25 and 25'. The vacuum will then hold the film flat against the glass plate 1 so that the film may be viewed without distortion and at the same time identification marks may be placed on the film if desired. When it is desired to move the film the vacuum is cut off. Operation of the plates is, or can be, independent for instance, when two separate films are used.

The end groove 5 on the platen adjacent to rollers 13 and 14 and corresponding groove on the opposite end, provide a seal of format area across the film width. A smaller groove with a similar function is adjacent the central loop forming slot. These grooves do the actual sealing as it is intended, they act first on film when vacuum is applied so that the minor grooves 3, 4, etc. can evacuate the format area. The central arms 12, 12' and rollers 13, 14 assist sealing film but do not seal film themselves.

The transverse grooves do not have to be very large and may be of the order of .015 inch in width and .005 inch depth. They are spaced about five inches apart and have tapering sides so as not to interfere with the viewing. Also, tapering minimizes scratching of film and chipping at groove edge. The manifold grooves 6 and 6' are about 3/32 inch deep and 1/4 inch wide. In many cases only one large manifold is required.

The upper roller 13 is mounted on a hinged bracket 30 for the purpose of facilitating the inserting of the film and is adapted to be clamped into position on the other side by means of the spring loaded knob 31 which fits into a slot in the film mounted bracket 32. There is a corresponding set of rollers, not shown, at the other end of the glass plate 1'.

FIGURE 8 shows a schematic diagram illustrating the use of the invention when it is desired to form a loop in the film. This is used where it is desirable to place two separate frames side by side in order to make visual comparison or obtain a stereoscope view.

This arrangement also may be used for mounting two separate rolls of film for comparison purposes.

As shown in FIGURE 8, the glass plates 1 and 1' are separated at the center line of the viewer in order to form a loop L in the film. The ends of the loops are held down by means of the arms 12, 12'. At the outer ends of the glass plates are mounted the hold down rollers, 13, 14 and 13', 14'.

Many modifications may be made by those who desire to practice the invention without departing from the scope which is defined by the following claims.

I claim:
1. Film holding means comprising,
   a glass plate having a plurality of communicating grooves in its upper surface,
   said upper surface being adapted to receive a flat film over said grooves,
   a manifold connected to said grooves,
   a source of vacuum connected to said manifold and said grooves to hold down said film,
   film clamping means comprising,
   a pivotally mounting arm extending over said film and adapted to clamp said film to said plate,
   and means to clamp said arm against said film and said plate.
2. Apparatus as in claim 1 wherein said clamping means comprises a pair of flexible bellows connected to said arm, one of said bellows located at each side of said film, said bellows being connected to said source of vacuum.
3. Apparatus as in claim 1 having a plurality of pivotally mounted arms.
4. Apparatus as in claim 1 having two separated glass plates and wherein one of said pivotally mounted arms are mounted on either side of the separation whereby a strip of film may be formed into a loop underneath said glass plates for the purpose of comparing separated frames of said film.
5. Apparatus as in claim 1 wherein said grooves are perpendicular to said manifold.

References Cited

UNITED STATES PATENTS 3,064,525  11/1962  Lemche _____ 88—24

NORTON ANSHER, *Primary Examiner.*

R. A. WINTERCORN, *Assistant Examiner.*

U.S. Cl. X.R.

248—363; 355—76